United States Patent [19]
Patterson

[11] Patent Number: 5,249,818
[45] Date of Patent: Oct. 5, 1993

[54] METHOD OF MAKING FRAMES FROM TUBULAR MEMBERS AND FRAMES MADE BY THE METHOD

[75] Inventor: Tod Patterson, Westport, Conn.

[73] Assignee: Cannondale Corporation, Georgetown, Conn.

[21] Appl. No.: 736,092

[22] Filed: Jul. 26, 1991

[51] Int. Cl.⁵ .................. B62K 19/28; B62K 19/22
[52] U.S. Cl. .................. 280/281.1; 304/252; 228/135; 83/54
[58] Field of Search .......... 280/281.1; 228/135; 403/252, 263, 266, 270, 230; 83/54; 29/895.211; 219/121.67

[56] References Cited

U.S. PATENT DOCUMENTS

| | | |
|---|---|---|
| 414,194 | 11/1889 | Cottle . |
| 421,482 | 2/1890 | Cottle . |
| 500,971 | 7/1893 | Starley . |
| 562,067 | 6/1896 | Copeland . |
| 603,244 | 5/1898 | Avery . |
| 643,591 | 2/1900 | Caswell . |
| 2,024,782 | 12/1935 | Schwinn . |
| 2,126,519 | 8/1938 | Vogel . |
| 2,356,732 | 8/1944 | Ball, Jr. ................. 280/281.1 |
| 3,009,719 | 11/1961 | Otto et al. ................. 403/252 |
| 4,356,376 | 10/1982 | Komanduri et al. ...... 219/121.67 X |
| 4,728,113 | 3/1988 | Thun, Jr. ................. 280/281.1 |
| 4,746,136 | 5/1988 | Kirk ................. 280/281.1 |

Primary Examiner—Robert J. Oberleitner
Assistant Examiner—Carla Mattix
Attorney, Agent, or Firm—Brumbaugh, Graves, Donohue & Raymond

[57] ABSTRACT

A frame that includes first and second tubular members, joined at a predetermined angle to each other solely by a bond along a joint between a surface along a portion of a wall of the first member and an edge along at least a portion of the wall of the second member, is fabricated by cutting the edge of the wall of the second member at the joint being to a shape that conforms to and abuts the surface of the first member so as to establish and maintain the predetermined angle between the members. The first member is formed with a slot that registers with the edge of the second member, and the second member is formed with an integral tab along part of the edge forming the joint. The tab on the second member is received in close-fitting relation in the slot of the first member so as to establish and maintain a predetermined position of the second member axially and rotationally relative to the first member.

19 Claims, 5 Drawing Sheets

METHOD OF MAKING FRAMES FROM TUBULAR MEMBERS AND FRAMES MADE BY THE METHOD

BACKGROUND OF THE INVENTION

Over about the last ten years, bicycles with frames fabricated from aluminum tubing have become increasingly popular. Unlike steel, aluminum cannot be brazed, so the joints between the tubes of most aluminum bicycle frames have been welded. The joints between the members of the main triangle usually involve welding an edge of a wall of one member, ordinarily an edge at the end of the member, to the surface of the wall of another member. In particular, the ends of the top tube and down tube are welded to the external surface of the head tube, and often to each other; the ends of the seat tube and the down tube are welded to the external surface of the bottom bracket tube and to each other; and the end of the top tube is welded to the surface of the seat tube. Each of these joints requires, first, forming the end of one tube so that it closely matches the surface of the other tube at a prescribed angle and, second, positioning the edge of that tube at the proper position axially and circumferentially as well with respect to the surface of the other tube.

The first of those steps has been performed using hole saws and special fixtures to set up a drill press to position the tube for forming the edge cut. For example, the down tube has a certain diameter and forms a certain angle with the head tube. To make the end cut in the down tube for the welded joint with the head tube, a hole saw having a diameter equal to the diameter of the head tube is installed in a drill press, and the down tube is held in a fixture so that the axis of the hole saw is at the same angle to the down tube as the head tube is in the completed frame. If the other end of the down tube has already been formed with an edge to match the bottom bracket tube, then the fixture also has to provide for making the cut at the proper axial location in the down tube stock with the tube in the proper circumferential position. The second step of the process requires all of the members of the frame to be set up in a special jig that will hold them in their proper relative positions while tack welds are made to establish the frame geometry.

All manufacturers usually make any given model of bicycle in several sizes. Each size requires that the members be of different lengths and that the cuts at the ends of the tubes be at different angles. That, in turn, requires making a different set-up of the drill press for each different size of any given frame member and for each different frame member. Because the edge cuts are almost always different for different size frames, as well as being different for different members of the frame, numerous fixtures and frequent changes in set-ups of the drill press are required to make the tubes for a given style of bicycle in a range of sizes. Similarly, a different erection jig is required for each size of bicycle. Accordingly, many manufacturers compromise the geometric variations required by different sizes in order to minimize production costs. When the manufacturer produces several models of bicycle, the amount of tooling and the down time for changing over from production of one size to another size frame, or from one style to another, are extremely costly. Also, if the manufacturer changes the design of a frame, considerable time and a large investment in tooling are required to make the change.

SUMMARY OF THE INVENTION

One object of the present invention is to provide an improvement in a method of making a frame made of tubular members joined by welding that greatly simplifies the assembly of the frame and eliminates the need for different jigs for each size and style of frame. Another object is to enable edge cuts to be made in the tubular members of a frame without special fixtures and individual set-ups of a machine tool to make different cuts.

According to one aspect of the invention, a method of making a frame that includes first and second tubular members joined at a predetermined angle to each other solely by a bonded joint between a surface along a portion of a wall of the first member and at least a portion of an edge of the second member is characterized by the steps of forming a slot in the wall of the first member at a position in register with a part of the edge of the second member at the joint so as to establish a predetermined position of the second member axially and rotationally relative to the first member and cutting the edge of the second member to conform to the wall of the first member and also cutting a tab along part of the edge. The edge cut is made by generating a cutting beam, providing relative movement between the cutting beam and the second member such that the cutting beam traverses a predetermined path over the wall of the second member so as to cut the edge to a shape such that it conforms to and abuts the wall portion of the first member and thereby establishes and maintains the predetermined angle between the members and also to form an integral tab along a part of the edge of the second member shaped and located to be received in close-fitting relation in the slot in the first member. The two members are fitted together with the tab of the second member received in the slot of the first member and the edge of the second member seated firmly against the wall surface of the first member, and a bond is made between the first and second members at the joint extending substantially coextensively with the abutting edge portion of the second member and the wall surface of the first member.

The edge cut in the second member is, preferably, made by directing the cutting beam substantially radially with respect to the axis of the second member and simultaneously rotating the second member about its axis and either moving the second member axially relative to the cutting beam or moving the cutting beam axially of the tube to form the edge and the tab in one pass of the cutting beam.

For making the bonds after the frame is fitted together, which may be tack bonds, forces are applied to the members so as to seat the abutting edge of the second member against the wall portion of the first member and establish the predetermined angle substantially solely by virtue of conformation of the abutting edge and so as to engage the tab of the second member in the slot of the first member and establish the rotational and axial position of the second member relative to the first member substantially solely by engagement of the tab in the slot.

In addition to making edge cuts at the joints, the beam-cutting technique used to make those cuts can also be used to form the slots in the first members of the joints, to cut holes for fittings joined to the frame and to cut notches in a portion of one member where a portion of another member fits into it.

According to another aspect of the invention, a frame is provided that includes first and second tubular members joined at a predetermined angle to each other solely by a bonding along a joint between a surface along a portion of a wall of the first member and an edge along at least a portion of the wall of the second member, the edge of the wall of the second member at the joint being shaped to conform to and abut the surface of the first member so as to establish and maintain the predetermined angle between the members. The invention is characterized in that the first member has a slot that registers with the edge of the second member and in that the second member has along part of the edge forming the joint an integral tab received in close-fitting relation in the slot of the first member so as to establish and maintain a predetermined position of the second member axially and rotationally relative to the first member.

The present invention is highly advantageous in the manufacture of bicycle frames—the following are examples of the joints of a bicycle frame that can be formed in accordance with the invention:

| First Member | Second Member |
| --- | --- |
| head tube | down tube |
| head tube | top tube |
| bottom bracket tube | down tube |
| bottom bracket tube | seat tube |
| seat tube | top tube |

Those joints are the joints of the main triangle of a bicycle frame. The joints of the seat stays with the chain stays, the joints of the seat stays with the seat tube, and the joints of the chain stays with the bottom bracket can also be made in accordance with the present invention.

The tab and slot arrangement, by which proper positioning of one tube relative to another to which it is joined is attained, enables the use of relatively simple universal jigs to hold the frame in assembled condition. The jigs require only relatively simple adjustments to accommodate different sizes and styles. In the case of the main triangle of a bicycle frame, for example, the jig can be designed to hold the bottom bracket and the seat tube in fixed positions and to apply a small force against the head tube in a direction toward the seat tube in a manner that permits the frame to self-position in accordance with the seating of the conforming edge cuts of the several tubes. If desired or necessary, gages and supports may be incorporated into the jig to ensure dimensional and geometric trueness of the particular frame. For example, it is desirable to include supports for the bottom bracket that hold it perpendicular to the plane of the axes of the seat tube, down tube, and top tube and transversely centered with respect to the plane and an adjustable support for the head tube to keep it centered in the plane. By and large, however, the dimensional and geometric form of the frame is established by the end cuts and the tabs and slots.

As mentioned above, the edge cuts, tabs, slots and notches in the tubes are made using a cutting beam, which may be a laser, water jet, or electron beam. A preferred way of forming the cuts is to direct the beam from a cutting beam generator that is movable lengthwise and, optionally, laterally of the tube and to rotate the tube about its axis in coordination with the movements of the beam, thereby causing the beam to traverse a path circumferentially and axially over the tube that will make the prescribed cut. The rotation of the tube and the movements of the cutting beam are made with computer numerically-controlled (CNC) machines. The beam can be turned on and off by computer control in coordination with movements of cutting beam generator along the work-piece between different cuts. A tube blank cut to a length greater than its final length can have edge cuts made at both ends. Any number of slots, notches and holes can be cut in the tube in sequence while it is loaded in the machine.

Usually, the head tube and bottom bracket will be cut to length by conventional equipment, because beam cutting leaves a slightly ragged edge and smooth ends are required on those tubes. Also, conventional lathe-type cutting operations produce a smooth, square edge at high speed. The slots in the head tube and bottom bracket tube are, preferably, cut using the beam cutter equipment, but they can also can be punched.

In a preferred technique of making the edge cuts, the cutting beam remains stationary laterally of the tube and is aligned to intersect the axis of the tube, the tube is rotated, and the cutting beam is moved longitudinally relative to the tube. The relative rotational and axial movements of the tube and the cutting beam results in cut edges that lie radially with respect to the tube axis throughout. Accordingly, the edge cut leaves the full thickness of the tube at the bond site, which is advantageous to making the bond. In the previous technique of making edge cuts with a hole saw, the edge is tapered over most of its extent, and the most sharply tapered regions are prone to "burn-off" of the thinned edge during welding. Burn-off impairs the welder's ability to achieve adequate weld penetration without applying excess heat to the material. Because the edge cuts of the invention are radial, the path of the cutting beam has to be adjusted to compensate for relative displacement of the radial elements of the edge with respect to the line of actual contact between the cut edge and the surface of the tube to which the edge is joined in the frame.

Just as the edge cuts are made with the aid of computer-controlled equipment, the frames are readily designed with computer-aided design (CAD) equipment. The CAD/CAM design and manufacturing process, which the invention preferably employs, permits design changes to be implemented very quickly. In conjunction with quality-control monitoring of the accuracy of production, running adjustments of the edge cuts, tabs slots can be made very quickly if the desired frame geometry is not being attained.

The present invention is not limited to bicycle frames and may be employed in the structure and the method of manufacture of any frame having tubular members, such as aircraft frames, furniture frames, wheelchair frames, and structural towers, such as antenna masts. The invention is also applicable to frames of various materials, including many metals and their alloys and various composite materials, such as those based on carbon fiber. The terms "bond" and "bonding" are used broadly herein to include fusion bonds (welds), chemical bonds, and adhesive bonds.

For a better understanding of the invention, reference may be made to the following description of exemplary embodiments, taken in conjunction with the accompanying drawings.

DESCRIPTION OF THE DRAWINGS

FIGS. 2 to 4 are fragmentary exploded detail views of the joints of the frame of FIG. 1, as indicated by the correspondingly labelled circles in FIG. 1; the figures numbered 2 to 4 with capital letter suffixes (A, B, etc.) are fragmentary detail views of the members shown in the correspondingly numbered FIGS. 2 to 4 taken from the vantage points indicated by the correspondingly, labelled lines in FIGS. 2 to 4;

DESCRIPTION OF THE EMBODIMENTS

Figure 1:
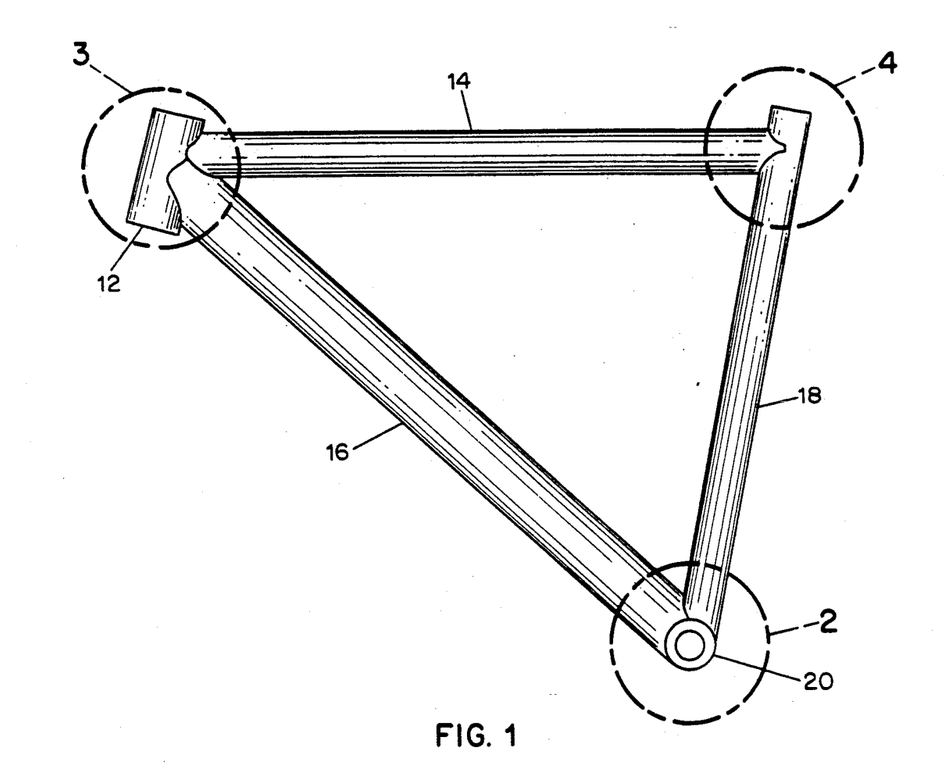
FIG. 1 is a side elevational view of a the main triangle of a bicycle frame incorporating the present invention.

The frame shown in FIG. 1 is the main triangle of a bicycle frame. It consists of a head tube 12, a top tube 14, a down tube 16, a seat tube 18, and a bottom bracket tube 20. All of those tubes are of circular cross-section and made of aluminum. The diameters and wall thicknesses of the respective tubes are carefully chosen to provide the requisite strengths and stiffness, while keeping the weight to a minimum. The tubes are joined at the illustrated joints (described below and shown in the other drawing figures) solely by weldments.

All of the joints are between first and second tubular members joined at a predetermined angle to each other solely by a weldment along a joint between a surface along a portion of a wall of the first member and an edge along at least a portion of the wall of the second member, the edge of the wall of the second member at the joint being shaped to conform to and abut the surface of the first member so as to establish and maintain the predetermined angle between the members. To this extent, the construction of the frame has been used for many years, as described above.

According to one aspect of the present invention, each first member has a slot that registers with the edge of the second member, and the second member has along part of the edge forming the joint an integral tab received in close-fitting relation in the slot of the first member so as to establish and maintain a predetermined position of the second member axially and rotationally relative to the first member. In two of the joints, two second members are joined to the same first member and to each other by weldments, one of the second members having a notch that receives a portion of the other second member. In particular, the frame of FIG. 1 has the following joints:

| First Member | Second Member |
| --- | --- |
| head tube 12 | down tube 16 |
| head tube 12 | top tube 14 |
| bottom bracket tube 22 | down tube 16 |
| bottom bracket tube 22 | seat tube 18 |
| seat tube 18 | top tube 14 |

Figure 2:
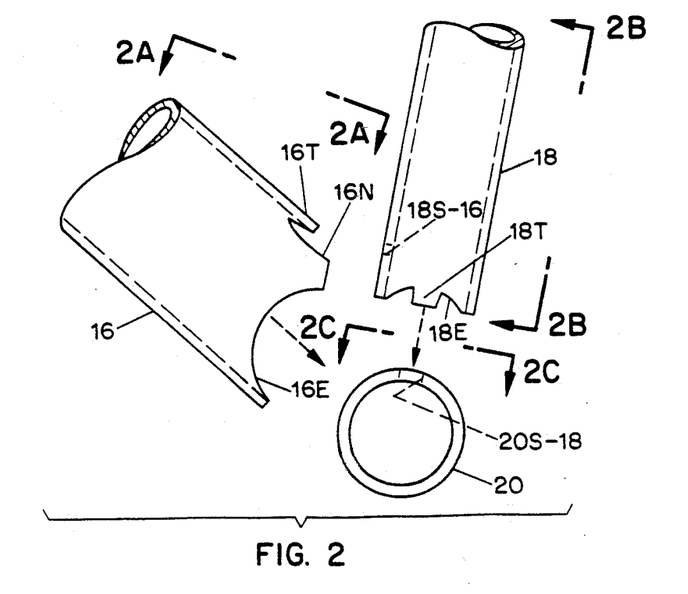
Figure 2A:
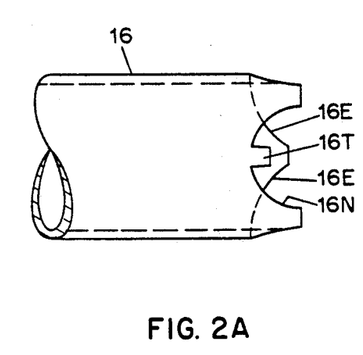
Figure 2B:
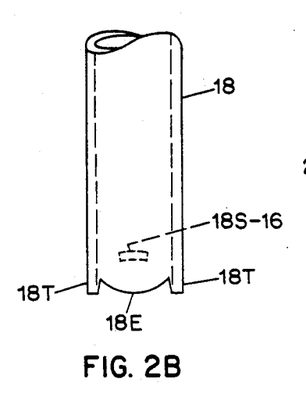
Figure 2C:
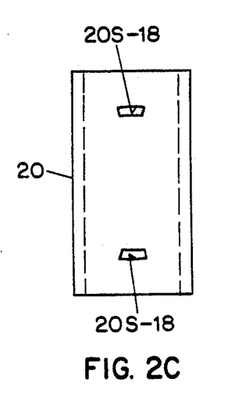
Figure 3:
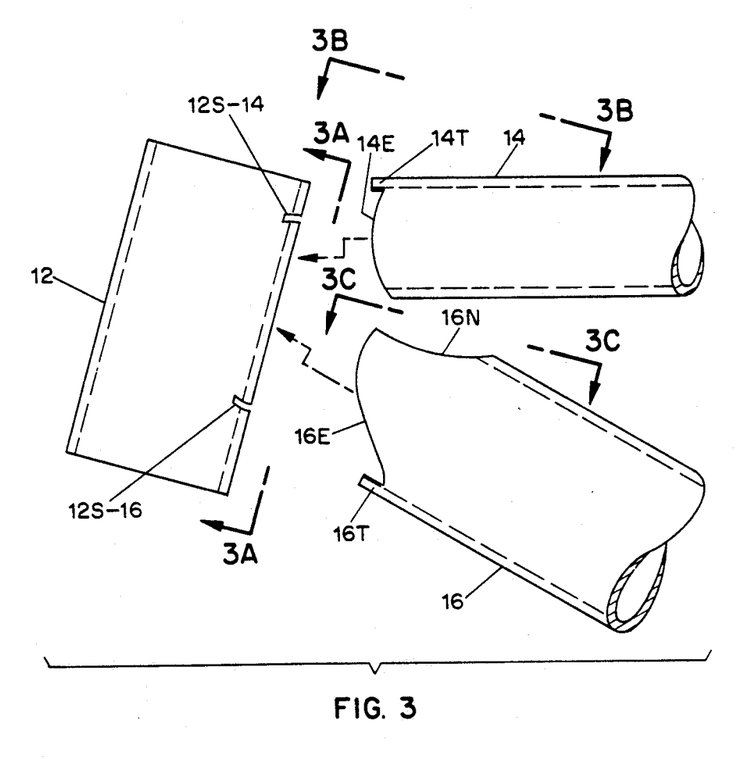
Figure 3A:
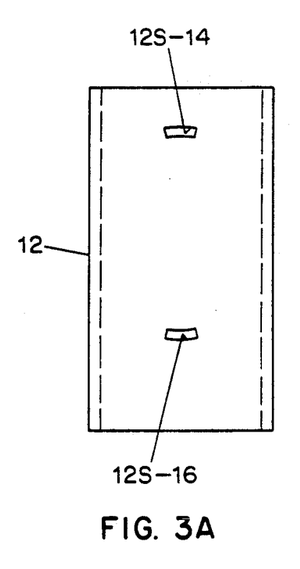
Figure 3B:
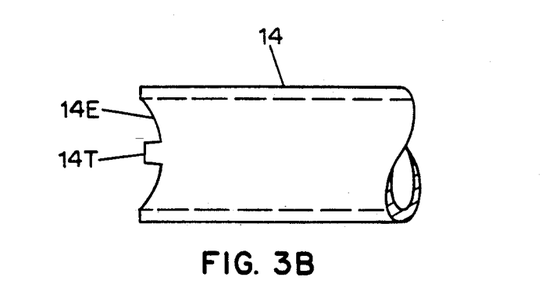
Figure 3C:
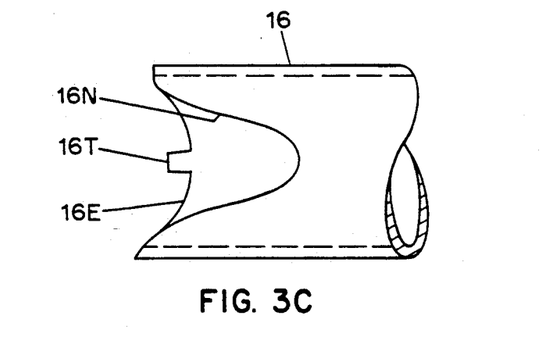
Figures 4, 4A, 4B:
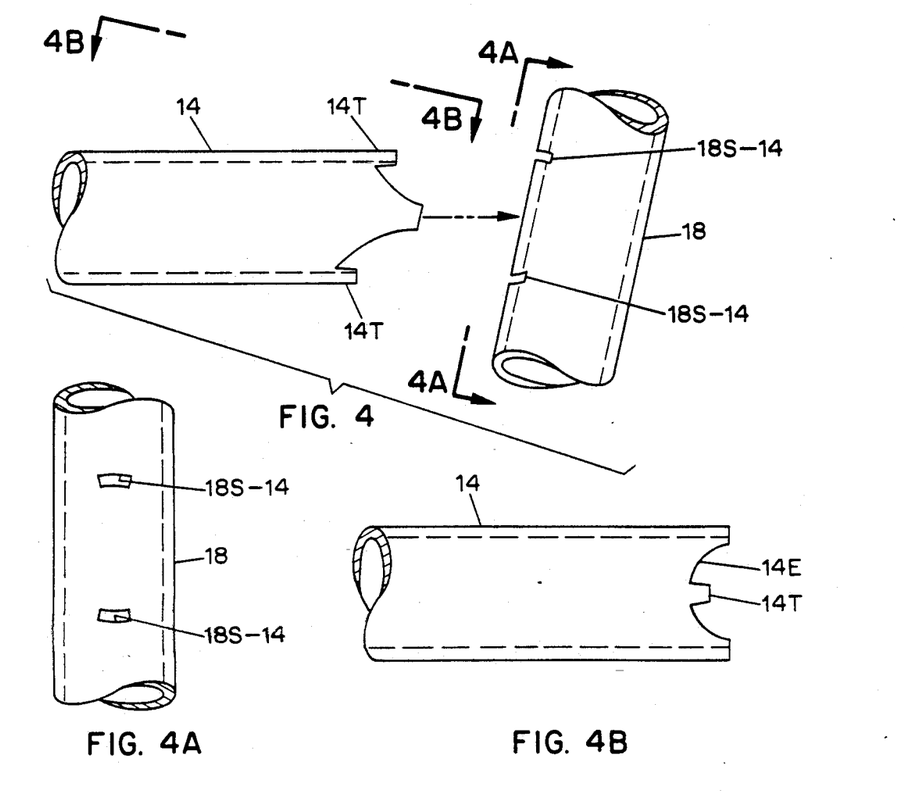
Figure 5:
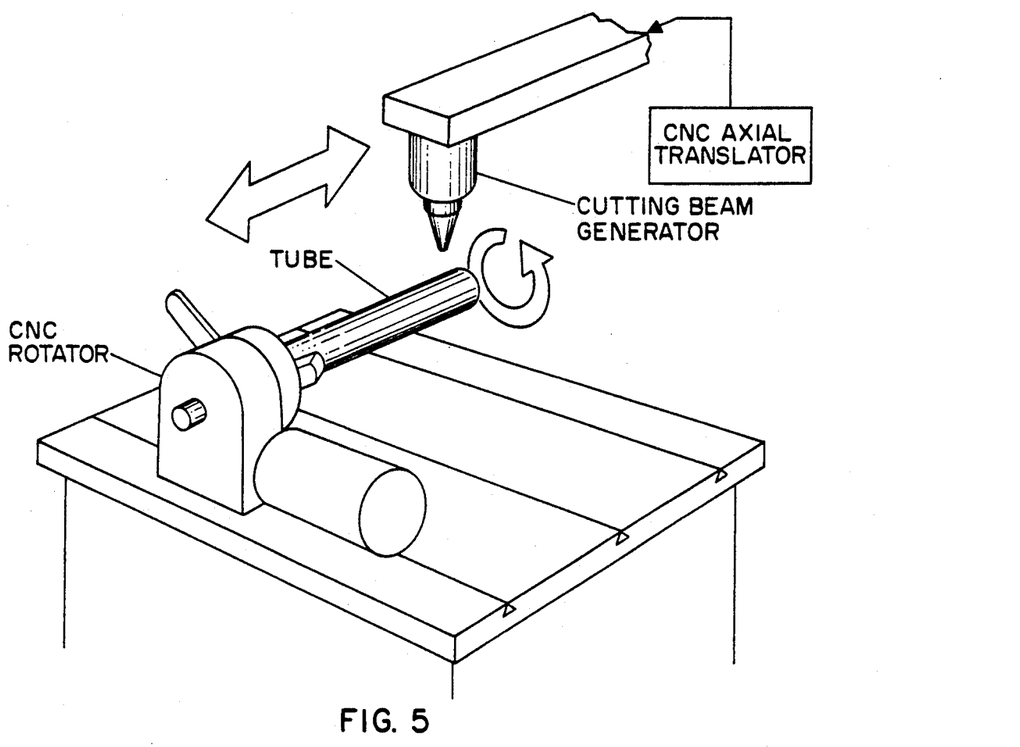
FIG. 5 is a schematic illustration of equipment for forming edge cuts, tabs, slots, notches and other holes in the tubes.

FIGS. 2, 3 and 4 show the construction of the respective joints indicated by the circles 2, 3 and 4 in FIG. 1.

In those figures, each edge of one member that abuts a portion of a wall of another member is indicated by the reference numeral of that member with the suffix "E." Each tab of a member is indicated by the reference numeral of that member with the suffix "T." Each slot in the other member of the joint is indicated by the reference numeral of that member with a suffix "S-" and the reference numeral of the member that has the tab that fits into that slot. (For example, the slot 20S-18 of the bottom bracket tube 20, FIG. 2, receives the tab 18T of the, seat tube 18, as described below.)

Referring to FIGS. 2, 2A, 2B, and 2C, the lower end of the down tube 16 has an edge cut 16E along a portion of the tube wall that is shaped to conform to and abut the surface of the bottom bracket tube 20 so as to establish and maintain a predetermined angle between the axis of the down tube and the axis of the bottom bracket tube, that angle being 90 degrees, and a predetermined position of the axis of the down tube relative to the axis of the bottom bracket tube. In the finished joint, a weldment is formed along the juncture between the edge 16E and the portion of the surface of the bottom bracket tube 20 that the edge 16E abuts.

The seat tube 18 has an edge 18E along a portion of the tube wall that is shaped to conform to and abut the surface of the bottom bracket tube 20 so as to establish and maintain a predetermined angle between the down tube and the bottom bracket tube, that angle also being 90 degrees. The seat tube 18 has along parts of the edge 18E forming the joint with the bottom bracket tube integral tabs 18T that are received in close-fitting relation in slots 20S-18 in the bottom bracket tube 20 so as to establish and maintain a predetermined position of the down tube axially and rotationally relative to the bottom bracket tube. In the finished joint, a weldment is formed along the juncture between the edge 18E and the portion of the surface of the bottom bracket tube 20 that the edge 18E abuts.

The down tube has a diameter somewhat greater than the diameter of the bottom bracket tube, and the edge 16E is offset to one side of the center axis (see FIG. 2). A notch 16N in the wall of the down tube is shaped to conform to and abut a portion of the surface of the wall of the seat tube 18, and in the finished joint a weldment is formed along the juncture between the notch 16N and the wall portion of the seat tube 18 that the notch abuts.

A tab 16T projects from a portion, of the notch 16T and is received in a slot 18S-16 in the wall of the seat tube 18. The tab 16T and the slot 18S-16 that receives it establishes indirectly the correct position of the down tube 16 relative to the bottom bracket tube 20, inasmuch as the seat tube is itself correctly located axially of the bottom bracket tube by the tabs 18T and the slots 20S-18 that receive them.

FIGS. 3 and 4 are sufficiently clear to enable the joints shown therein to be understood without any description, reference being made to the generic labelling of the tubes, edge cuts, notches, tabs and slots given above.

It is desirable, though not necessary, to form the tabs with side edges that converge slightly in order to facilitate fitting them into the slots when the frame is assembled. Where the tubes intersect obliquely, it is important to control the position of only the longer edge of the slot that is closer to the obtuse included angle between the walls of the tubes in order to establish the proper axial position of the other tube, inasmuch as the tube will be forced toward that edge when the frame is assembled. It will often be possible to have only a single tab and slot at a joint to attain the desired axial and circumferential relative orientations of the tubes—the edge cut at the joint will ensure proper registration and alignment.

The edges E, notches N and tabs T of the second members (tabulated above) of the various joints of the frame are made by a cutting beam, which may be a laser beam, a water jet or an electron beam, a laser beam being preferred. Relative movement is provided between the beam and the tube being cut such that the beam traverses a predetermined path over the wall of the tube and makes the desired cut. The simplest and most effective way to cut the edges, notches and tabs is to rotate the tube about its axis, direct the beam so that it intersects the axis of the tube, and simultaneously move the beam axially relative to the tube as the tube rotates, as shown schematically in FIG. 7, by means of computer numerically-controlled (CNC) machines, e.g., a CNC rotator and a CNC axial translator. Machines having the capability of making the desired motions are commercially available from several sources. Where a tube requires multiple cuts to form edges and/or notches at multiple joints, all of them can, of course, be made automatically while the tube remains loaded in the chuck, the beam cutter being computer-controlled to turn on and off in coordination with movements of the tube between cuts by the CNC machines. Holes and slots can be cut in the tubes for various fittings and for tabs of the seat stays and chain stays (not shown).

The technique of moving the tube rotationally relative to a radially directed, axially moving beam (see FIG. 6) produces a cut in which the cut edge is not tapered or feathered, which makes for better welds. The fact that the cut edges at the joints do not match the curvature of the wall surface of the other member means, however, that the path of the cutting beam has to be adjusted such that the extremity of the cut will conform to and abut the surface of the other member.

Figure 6:
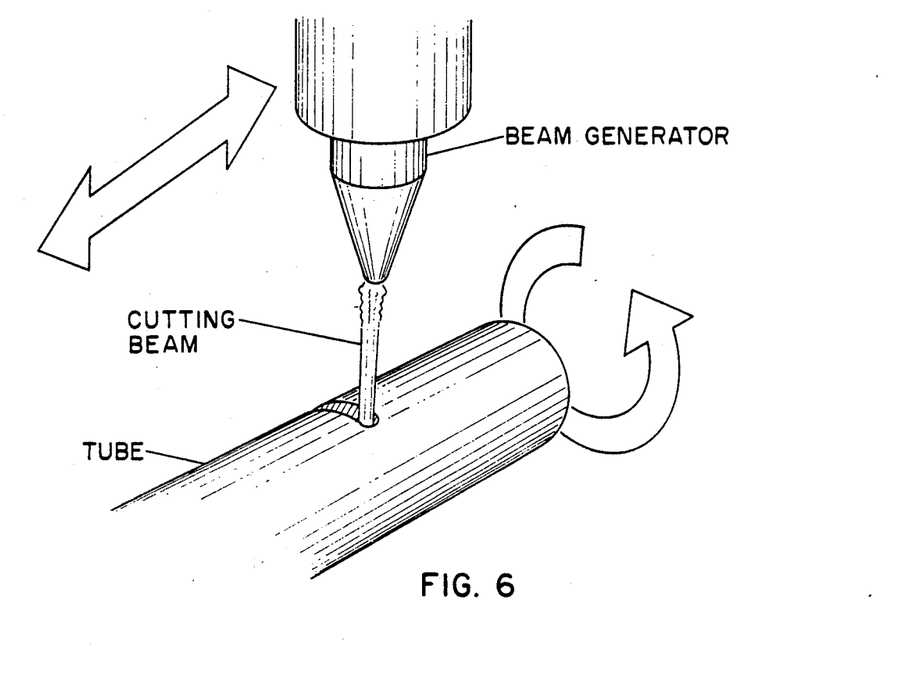
FIG. 6 is a detailed schematic illustration of a cutting beam forming an edge cut.

The technique described above for making the cuts is not critical. It is also suitable to move the cutting beam both axially and transversely while making a cut. For example, the slots can be cut while the tube is stationary by moving only the beam. As is known per se, the energy of the beam is controlled so that the beam cuts only through the wall of the tube nearer to the beam generator, the energy being dissipated and the beam having no effect on the wall of the tube farther from the generator. The required energy of the beam is a function of the wall thickness of the tube and the rate of movement of the beam along the cutting trajectory.

The frame is assembled in a relatively simple, adjustable jig, which is designed to seat all of the conforming and abutting edges of the tubes firmly against the surfaces of the tubes they abut. As shown schematically in FIGS. 7 and 8, the bottom bracket tube 20 is held securely, such as by holding it in tapered mandrels 30 on a carriage 32, with its axis perpendicular to the plane of the axes of the top, down and seat tubes. The seat tube 18 is fitted to the bottom bracket tube 20, forced firmly toward the bottom bracket tube 20 by a tapered mandrel 34 on a carriage 36 so as to lie in the plane of the down tube and top tubes and to also remain stationary in that plane against forces directed rearwardly. The top tube 14, down tube 16, and head tube 12 are fitted at their respective joints and need only be supported by means of the head tube 12 to remain in a common plane. The tabs and slots at the joints and the conformity of the respective cut edges ensure that the tubes having the cut edges are properly positioned rotationally and axially relative to the tubes which they abut. The abutments of the cut edges with the wall surfaces provide the proper angular relationships of the tubes at the joints between the various first and second members (see the table above). A force is applied to the head tube in the plane of the main members (down tube, top tube and seat tube) approximately perpendicular to the axis of the head tube. Alignment of the axis of the head tube with the plane of the main frame frame tubes and at the proper angle (rake) to the seat tube 18 is ensured by tapered mandrels 38 that are movably supported on an adjustable carriage 40. The force applied by the carriage 40 firmly seats all of the joints. All of the joints are tack welded, the frame is removed from the jig, and the welds are completed.

Figure 7:
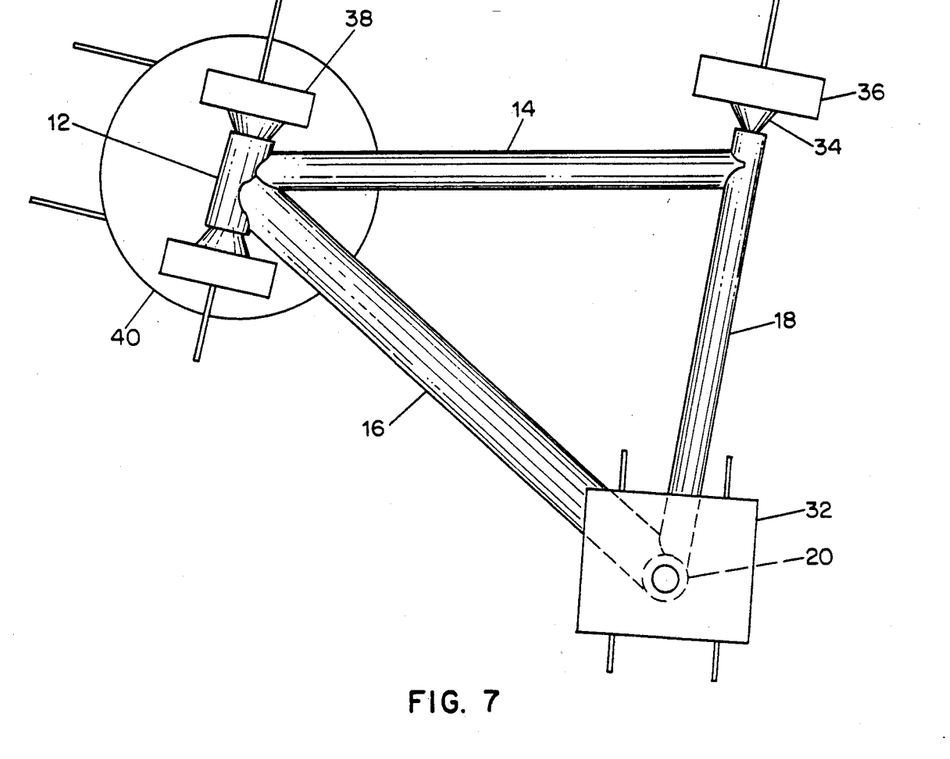
FIG. 7 is a side elevational view, in generally schematic form, of a fixture for holding the frame for tack-bonding.
Figure 8:
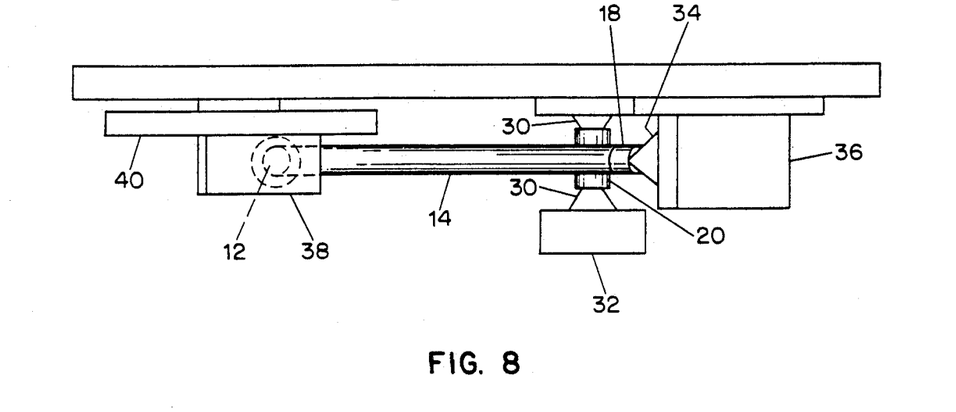
FIG. 8 is a top plan view of the fixture shown in FIG. 7.

The jig can be equipped with measuring instrumentation for use in statistical process control. Suitable control measurements include (1) the differential angle between the axes of the seat tube 18 and the head tube and (2) the distance in the plane of the main frame tubes between the axis of the bottom bracket tube and the point where the axis of the head tube 12 intersects the plane of the bottom edge of the head tube.

I claim:

1. A method of making a frame that includes first and second tubular members joined at a predetermined angle to each other solely by a bonded joint between a surface along a portion of a wall of the first member and at least a portion of an edge of the second member characterized by the steps of forming a slot in the wall of the first member at a position in register with a part of the edge of the second member at the joint so as to establish a predetermined position of the second member axially and rotationally relative to the first member, generating a cutting beam, providing relative movement between the cutting beam and the second member such that the cutting beam traverses a predetermined path over the wall of the second member such as to cut the edge to a shape such that it conforms to and abuts the wall portion of the first member and thereby establishes and maintains the predetermined angle between the members and also to form an integral tab along a part of the edge of the second member shaped and located to be received in close-fitting relation in the slot in the first member, fitting the second member to the first member with the tab of the second member received in the slot of the first member and the edge of the second member seated firmly against the wall surface of the first member, and forming a bond between the first and second members at the joint extending substantially coextensively with the abutting edge portion of the second member and the wall surface of the first member.

2. A method of making a frame according to claim 1 characterized in that the cutting beam is directed substantially radially with respect to the axis of the second member, the second member is rotated about its axis, and simultaneously relative axial movement is provided between the cutting beam and the second member to form the edge and the tab in one pass of the cutting beam.

3. A method of making a frame according to claim 1 and further characterized in that the slot is formed in the first member by generating a cutting beam and providing relative movement between the beam and the first member along a predetermined path.

4. A method of making a frame according to claim 3 and further characterized in that the cutting beam is directed substantially radially with respect to the axis of the first member, and the first member is rotated about its axis and simultaneously relative axial movement is provided between the cutting beam and the first member to form the slot in one pass of the cutting beam.

5. A method of making a frame according to claim 1 and further characterized by the step of applying forces to the members after they are fitted together at the joint so as to seat the abutting edge of the second member against the wall portion of the first member and establish the predetermined angle substantially solely by virtue of conformation of the abutting edge and so as to engage the tab of the second member in the slot of the first member and establish the rotational and axial position of the second member relative to the first member substantially solely by engagement of the tab in the slot.

6. A method of making a frame according to claim 1, the frame being a bicycle frame, and further characterized in that the first member is a head tube and the second member is a down tube.

7. A method of making a frame according to claim 1, the frame being a bicycle frame, and further characterized in that the first member is a head tube and the second member is a top tube.

8. A method of making a frame according to claim 1, the frame being a bicycle frame, and further characterized in that the first member is a bottom bracket tube and the second member is a down tube.

9. A method of making a frame according to claim 1, the frame being a bicycle frame, and further characterized in that the first member is a bottom bracket tube and the second member is a seat tube.

10. A method of making a frame according to claim 1, the frame being a bicycle frame, and further characterized in that the first member is a seat tube and the second member is a top tube.

11. A frame that includes first and second tubular members joined at a predetermined angle to each other solely by a bond along a joint between a surface along a portion of a wall of the first member and an edge along at least a portion of the wall of the second member, the edge of the wall of the second member at the joint being shaped to conform to and abut the surface of the first member so as to establish and maintain the predetermined angle between the members, characterized in that the first member has a slot that registers with the edge of the second member and in that the second member has along part of the edge forming the joint an integral tab received in close-fitting relation in the slot of the first member so as to establish and maintain a predetermined position of the second member axially and rotationally relative to the first member.

12. A frame according to claim 11 and further characterized in that the edge of the second member at the joint and an edge defining the tab have surfaces that lie radially with respect to the axis of the second member throughout their extents.

13. A frame according to claim 12 and further characterized in that the edge of the second member at the joint and the edge defining the tab of the second member are formed by a cutting beam directed substantially radially of the axis of the second member while providing relative movement between the second member and the cutting beam along a path defining said surfaces.

14. A frame according to claim 11 and further characterized in that the slot in the first member is formed by a cutting beam directed substantially radially of the axis of the first member while providing relative movement between the first member and the cutting beam along a path defining the slot.

15. A frame according to claim 11, the frame being a bicycle frame, characterized in that the first member is a head tube and the second member is a down tube.

16. A frame according to claim 1, the frame being a bicycle frame, characterized in that the first member is a head tube and the second member is a top tube.

17. A frame according to claim 11, the frame being a bicycle frame, characterized in that the first member is a bottom bracket tube and the second member is a down tube.

18. A frame according to claim 11, the frame being a bicycle frame, characterized in that the first member is a bottom bracket tube and the second member is a seat tube.

19. A frame according to claim 11, the frame being a bicycle frame, characterized in that the first member is a seat tube and the second member is a top tube.

* * * * *